Feb. 6, 1973 J. B. KUCERA Re. 27,573

MACHINE AND METHOD FOR DRYING GRAIN

Filed Dec. 20, 1968 3 Sheets-Sheet 1

INVENTOR.
JOSEPH B. KUCERA

BY Ralph R. Powell

ATTORNEY.

Feb. 4, 1973 J. B. KUCERA Re 27,573

MACHINE AND METHOD FOR DRYING GRAIN

Filed Dec. 20, 1968 3 Sheets-Sheet 2

INVENTOR.
JOSEPH B. KUCERA
BY Rudolph R. Powell
ATTORNEY.

Feb. 6, 1973 J. B. KUCERA Re. 27,573

MACHINE AND METHOD FOR DRYING GRAIN

Filed Dec. 20, 1968 3 Sheets-Sheet 3

INVENTOR.
JOSEPH B. KUCERA

BY Ralph R. Powell

ATTORNEY.

United States Patent Office

Re. 27,573
Reissued Feb. 6, 1973

27,573

MACHINE AND METHOD FOR DRYING

Joseph B. Kucera, Traer, Iowa, assignor of a fractional part interest to Rudolph L. Lowell, Des Moines, Iowa Original No. 3,524,264, dated Aug. 18, 1970, Ser. No. 785,651, Dec. 20, 1968. Application for reissue Nov. 8, 1971, Ser. No. 196,716
Int. Cl. F26b 7/00
U.S. Cl. 34—20 12 Claims

Matter enclosed in heavy brackets [ ] appears in the original patent but forms no part of this reissue specification; matter printed in italics indicates the additions made by reissue.

ABSTRACT OF THE DISCLOSURE

The grain drier is adapted for continuous or batch drying and includes a portable frame that carries upright inner and outer grain receiving passage. Secured to the lower end of the outer wall is a downwardly converging perforated cooling wall having a centrally disposed dried grain outlet. The lower end of the inner wall is spaced upwardly from the lower end of the outer wall so as to form with the cooling wall a circular outlet for the grain passage. Drying air is drawn upwardly through the cooling wall and within the space defined by the inner wall, where it is heated and passed through the grain passage over the full length of such passage. The rate of flow of grain from the passage onto the cooling wall is controlled in accordance with predetermined drying requirements so tha tonly grain of substantially uniform moisture content is discharged through the dried grain outlet.

SUMMARY OF THE INVENTION

The grain drier of this invention is economical in cost, simple in construction and efficient in operation to uniformly dry grain regardless of wind conditions prevailing during the drying operation or the initial moisture content of the grain to be dried. The grain flow through the machine is in a downward direction at all times, and the grain from its introduction into and discharge from the machine is continuously acted upon first by heated air and then by cooling air. The entire area of the grain cooling wall functions as the air inlet for the blower of the heating unit and the entire circumferential area of the grain drying passage functions as an air outlet, so that the blower is not starved and is capable of operating at all times at maximum efficiency. This efficiency of the blower for grain drying and cooling purposes is complemented by maintaining the depth of grain, through which air flow takes place, at about six inches or less. A further important feature of the invention is the holding of the grain in the grain drying passage until it has been dried to a predetermined moisture content. This is accomplished by a control at the outlet of the grain passage which functions to block the flow of wet grain therethrough due to the inability of wet grain to flow freely. However, when this wet grain becomes properly dried its movement is automatically continued through the outlet and onto the cooling wall for discharge from the machine. The grain flow through the grain passage outlet, therefore, is not uniform over the entire area thereof, since such flow takes place only after the grain has been dried to a predetermined moisture content. Wind action blowing against one side of the grain passage thus merely delays the grain drying action at such one side until proper drying has taken place. By virtue of the controlled flow of grain through the grain passage, the machine is readily adapted to handle and efficiently dry various types of grain such as corn, oats, wheat, barley and the like.

DETAILED DESCRIPTION OF THE INVENTION

Figure 1:
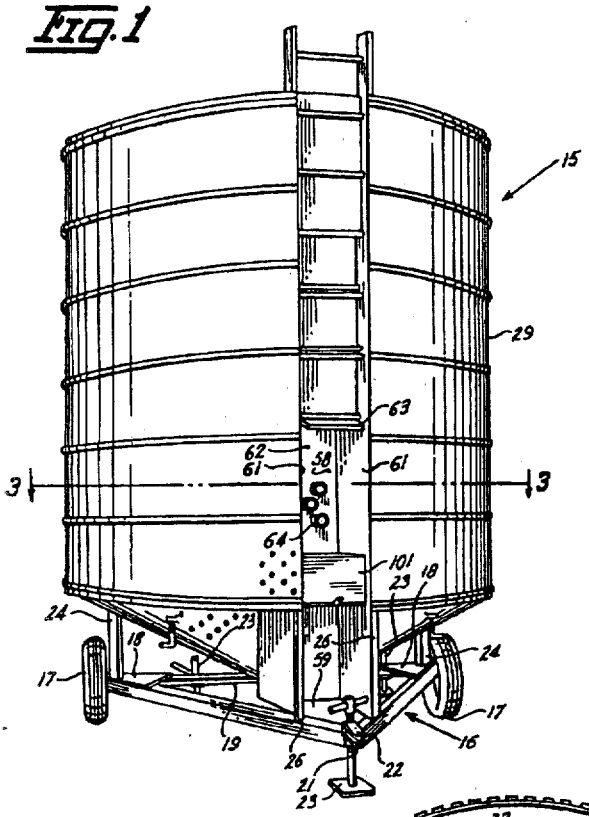
FIG. 1 is a front perspective view of the grain drying machine of this invention.
Figure 2:
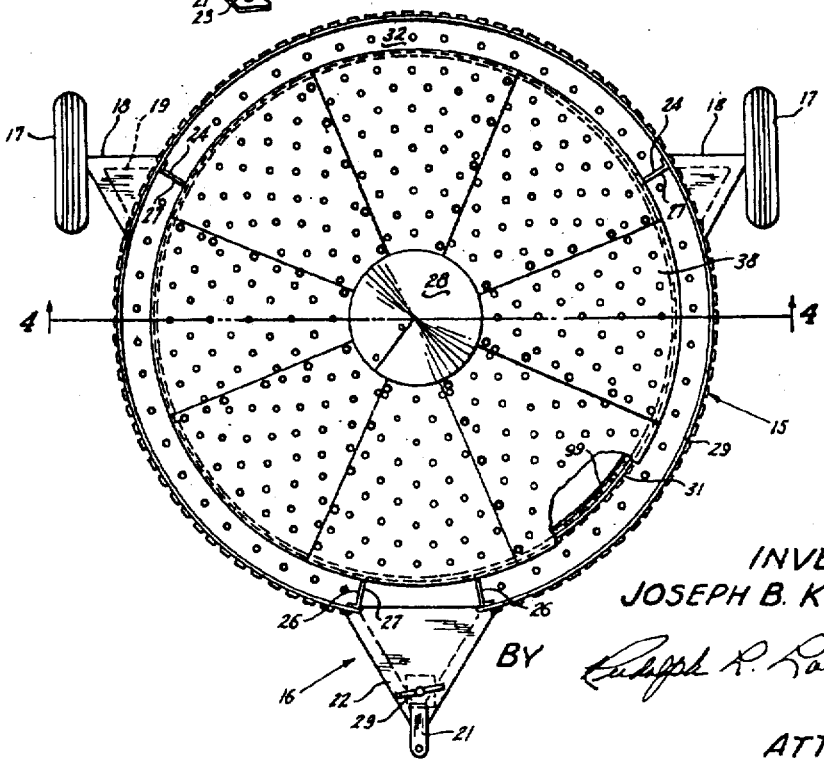
FIG. 2 is a top plan view of the machine shown in FIG. 1.

In FIGS. 1 and 2 the drying machine, indicated generally at 15 is illustrated as including a portable frame 16 of a generally equilateral triangular shape in plan view having ground wheels 17 rotatably supported at opposite ends 18 of the frame base member 19. A hitch member 21 projected forwardly from the frame apex section 22 is adapted for connection with a towing vehicle (not shown). When the machine is in use and disconnected from the towing vehicle the frame 16 is horizontally levelled by the provision of ground engaging jack assemblies 23 that are carried on the base member 19 and apex section 22.

Projected upwardly from adjacent each end 18 of the base member 19 is a channel member 24. A pair of spaced upright channel members 26 are projected upwardly from the apex section 22. All of the channel members 24 and 26 are of the same size and of substantially equal height and as shown in FIG. 2 are arranged with their base or web sections 27 extended generally radially of the center point of the portable frame 16 indicated at 28 in FIG. 2.

Spaced upwardly from the ground wheels 17 and secured to the outer legs of the channel members 24 and 26 is an outer circular perforated upwright wall 29 which is cut away between the front channel members 26 over its full height. An inner perforated circular upright wall 31, secured to the inner legs of the channel members 24 and 26, has a lower section cut away between the front channel members 26. The inner and outer walls 29 and 31 are thus arranged in a concentrically spaced relation to form a grain passage 32 that has a width equal to the width of the web sections 27 of the upright channel members 24 and 26.

Figure 4:
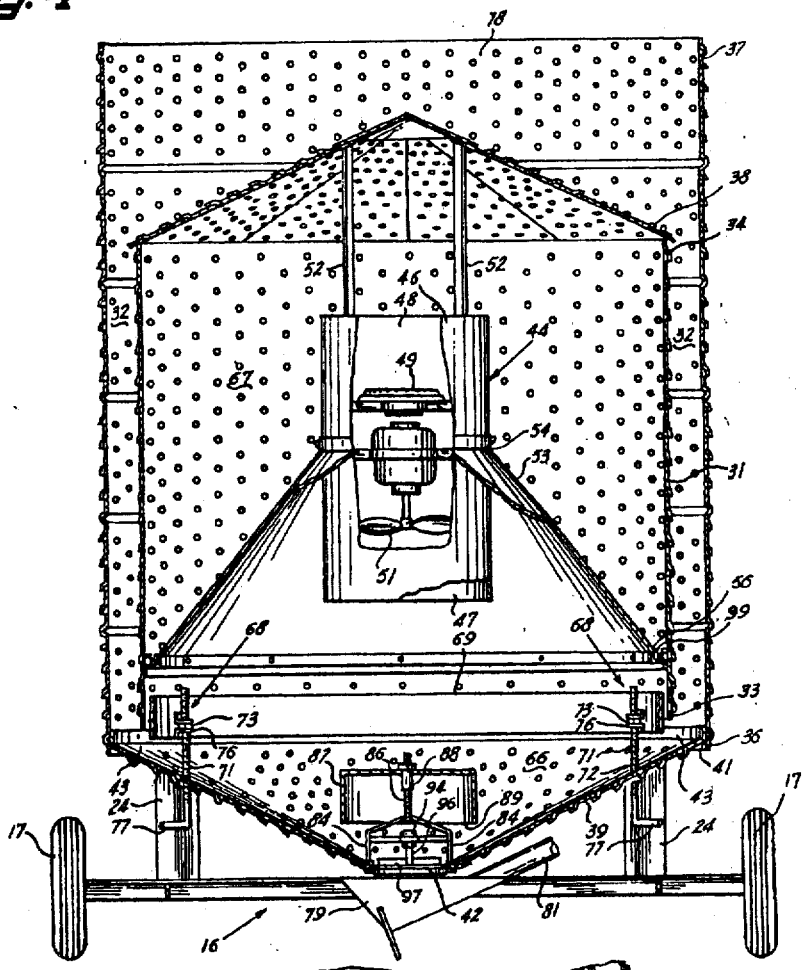
FIG. 4 is a vertical sectional view as seen along the line 4—4 in FIG. 2.

As shown in FIG. 4 the inner wall 31 is of a shorter height than the outer wall 29 and is positioned with its lower and upper ends 33 and 34, respectively, spaced above and below the lower and upper ends 36 and 37, respectively, of the outer wall 29. The inner wall 31 is provided with a cone-shaped top wall 38 having a peripheral portion secured to the upper end 34 of the inner wall and an apex portion located below the level of the upper end 37 of the outer wall 29. A bottom or lower wall 39 of an inverted frusto-cone shape has the outer peripheral edge 41 thereof secured to the lower end 36 of the outer wall 29. The central portion of the bottom wall 39 is formed with a dried grain outlet 42.

It is seen, therefore, that grain supplied within the open to pend of the outer wall 29 is directed by the cone shaped member 38 at the top of the inner wall 31 for gravity flow into the angular grain passage 32, and downwardly of the passage 32 for flow outwardly therefrom and onto the bottom wall 39 through the annular outlet 43 formed between the lower ends 33 and 36 of the inner and outer walls 31 and 29, respectively. The grain thus delivered to the bottom wall 39 flows downwardly for discharge from the machine 15 through the dried grain outlet 42.

Located in a concentrically spaced relation within the inner wall 31 is a heater unit 44 (FIGS. 3 and 4) of a conventional type that includes an upright cylindrical housing 46 the lower end of which constitutes an inlet 47 for cold air and its upper end an outlet 48 for heated air. Mounted within the housing 46 is a burner unit 49 and a blower unit 51 relatively arranged so air drawn into housing inlet 47 is discharged by the blower about the burner 49 for travel of the heated air from the housing outlet 48. The housing 46 is supported directly from the top cone member 38 by hangar members 52.

A partition member 53 (FIGS. 3 and 4) of a frustoconical shape has its upper end 54 secured about the housing at a substantially midway position on the housing 46. The lower peripheral portion of the partition member 53 terminates in an annular ring member 56 of a channel shape in transverse cross section having its outer leg secured to the inner wall 31 at a position adjacent the inner wall lower end 33. The partition member 53 is cut away over the portion thereof, indicated at 57 in FIG. 3, at a position between the front channel members 26 to provide for the location of an operator's compartment 58 (FIG. 1) that has a floor section 59 mounted on the portable frame, sidewalls 61 and back and top walls 62 and 63, respectively. The back wall 62 constitutes an instrument panel for the controls 64 of the machine 15. It is thus seen that the partition member 53 (FIG. 4) divides the space defined by the inner wall 31, operator compartment walls, top wall member 38 and lower wall member 39 into a cool air chamber 66 and a hot air chamber 67.

A control valve 68 (FIGS. 4 and 5) for regulating the flow of grain through the grain passage outlet 43 includes an upright ring member 69 arranged in a telescopic relation with the lower end of the inner wall 31 for adjustable vertical movement relative to the inner wall lower end 33 so as to constitute an adjustable extension of the inner wall toward and away from the bottom wall 39. This adjustment is accomplished by the provision of a series of adjustable upright screw assemblies 71 that are spaced about the inner peripheral surface of the ring member 69. Each screw assembly 71 has a threaded shank 72 projected upwardly through the bottom wall 39 for threaded engagement with an associated nut 73 that is secured to the ring member 69. A collar 74 fixed on each screw shank 72 is supported between a pair of vertically spaced bearing members 76 that are carried on the under side of the bottom wall 39 and receive a shank 72 therethrough. The lower end of each screw shank 72 terminates in a laterally extended handle 77.

Figure 5:
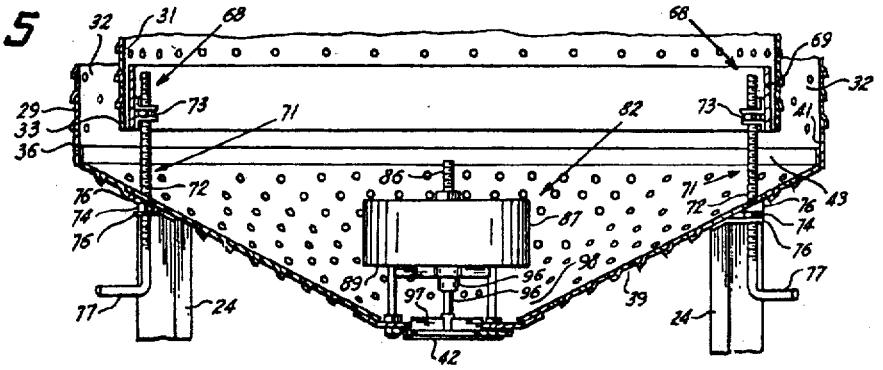
FIG. 5 is a sectional detail view showing the control means for regulating the flow of grain from the grain drying passage.
Figure 6:
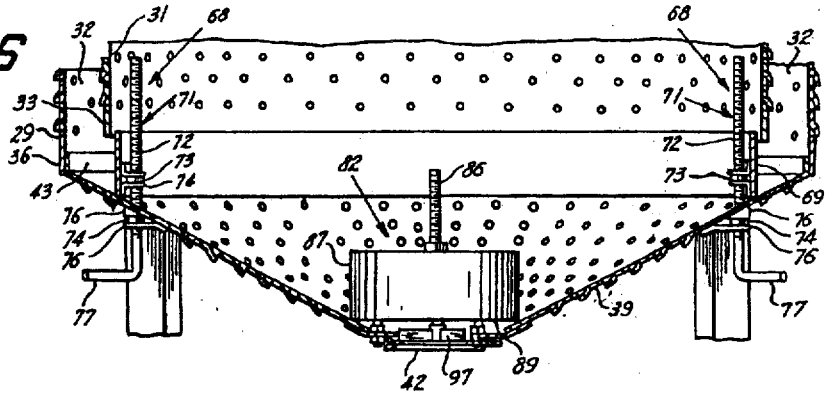
FIG. 6 is illustrated similarly to FIG. 7 and shows the control means in a changed position.

On manipulation of the handles 77 the screws are rotatable in one direction to move the ring member 69 to its upper position shown in FIG. 5 so as to completely open the annular outlet 43 of the grain passage 32. On rotation of the screws in an opposite direction the ring member 69 is movable to a lower position as shown in FIG. 6 to close the outlet 43.

In the operation of the machine 15 for the batch drying of grain the control valve 68 is moved to a closed position and grain is supplied into the open top end of the outer wall 29 to fill the annular grain passage 32 and a hopper 78 that is formed by the top wall 38 and the upper portion of the outer wall 29. With the heater unit 44 in operation atmospheric or cool air is drawn by the blower 51 through the perforated bottom wall 39, into the cool air chamber 66 and through the heater inlet 47 for discharge from the heater outlet 48 into the hot air chamber 67. From the hot air chamber 67 the heated air is forced transversely through the annular grain passage 32 over substantially its full length, and upwardly through the top wall 38 and the hopper 78 so as to act upon all portions of the grain within the machine 15.

After the grain has been dried to a predetermined moisture content the control valve 68 is opened so that the dried grain is free to travel downwardly of the grain passage 32 and onto the bottom wall 39 for discharge through the grain outlet 42 and into the hopper 79 (FIG. 4) of a usual grain unloading auger 81 for unloading either into a receiving wagon or into a grain bin.

In a continuous grain drying operation the same procedure is followed as for the batch drying operation described above. However, when the grain within the lower portion of the grain passage 32 reaches a predetermined moisture content the control valve 68 is partially opened to regulate the rate of flow of the grain downwardly through the grain passage 32. This rate of flow is predicated on the time required for the grain to travel through the grain passage 32 to provide for the grain at the lower end of the passage being at the predetermined moisture content. Stated otherwise the rate of flow is dependent upon the initial moisture in the grain and the heat required to bring the grain to a predetermined moisture content.

By virtue of the cool air being drawn through the bottom wall 39, the dried grain flowing from the passage outlet 43 is subjected to a cooling action prior to its discharge from the grain outlet 42 whereby to better condition the grain for storing purposes. Likewise, it will be noted that the heat thus removed from the dried grain increases the temperature of the atmospheric air admitted into the cool air chamber 66 so as to aid in the heating efficiency of the heater unit 44. It will be further noted that the blower unit 51 is maintained at maximum efficiency by virtue of the large inlet area afforded by the perforated bottom wall 39 so that the blower is not starved for air.

Due to wind conditions that may be acting against the outer wall 29 and to varying moisture conditions of the grain being dried uniform drying of the grain will not take place if all of the grain passed through the outlet 43 at the same rate. This non-uniformity of moisture content in the dried grain is overcome by virtue of the fact that wet grain has a retarded flow relative to dry grain. As a result wet grain on reaching the outlet 43 will tend to pack rather than flow. Because of this packing tendency of the wet grain, such grain is retained within the grain passage 32 for a longer time period than the properly dried grain which will immediately flow through the outlet 43. When the wet grain retained at the outlet 43 has been properly dried it will automatically flow through the control valve 68 onto the downwardly inclined bottom or cooling wall 39.

Thus, during a continuous grain drying operation the flow of grain outwardly through the passage 43 will be non-uniform over various portions of the passage 43. Importantly, however, all of the grain passing from the outlet 43 will be properly dried and of a uniform moisture content. This dried grain from the outlet 43 moves downwardly of the cooling wall 39 for discharge through the dried grain outlet 42.

It is seen, therefore, that the rate of grain flow downwardly of the grain passage 32 is regulated by the control valve 68 in accordance with the heating or drying requirements of the kind of grain being dried. In the drying of oats and like light weight grains it has been found that satisfactory cooling and drying is obtained by permitting the oats to flow unobstructed from the passage outlet 43 and downwardly of the cooling wall 39 to the discharge outlet 42. When heavier weight grain such as corn is being dried it may be desirable at times to prolong the cooling and drying period to properly condition the corn for storage.

Figure 7:
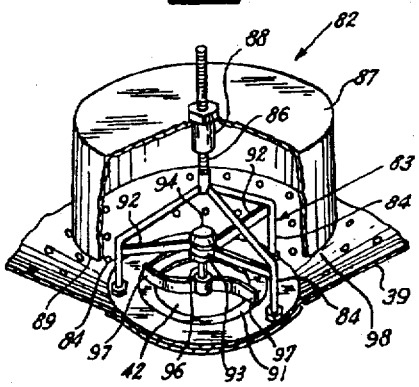
FIG. 7 is a detail perspective view of a grain discharge sweep mechanism that forms part of the machine.

For this purpose there is provided a flow control mechanism 82 for the discharge outlet 42 (FIG. 7) which includes an upright frame 83 of an open or spider construction having upright legs 84, illustrated as three in number, that are circumferentially spaced about the outlet 42 with their lower ends secured to and mounted on the cooling wall 39. The upper ends of the legs 84 are bent inwardly for connection to a common upright support screw 86 that is in coaxial alignment with the outlet 42. A control member 87 of an inverted pan shape has a hub member 88 threadably adjustable on the support screw 86 for vertical adjustment of the lower peripheral ring 89 thereof relative to the cooling wall 39. Thus, by lowering or raising the control member 87 the flow of grain through the outlet 42 is retarded or accelerated, respectively.

It will be appreciated that when the grain flow is retarded the grain will tend to pile upwardly of the cooling wall 39 so as to form a layer of grain on the cooling wall 39. Since the cooling wall 39 is of a relatively large area the grain layer may be of a thickness of about three inches without interfering with a free flow of air therethrough into the cool air chamber 66. The cooling and drying action on the wall 39 is thus maintained without starving the blower unit 51 while providing for an initial heating of the atmospheric air supplied to the blower unit 51 and an increase in the heating efficiency of the heater unit 44.

The side wall of the grain discharge outlet 42 is defined by a flat ring member 91 (FIG. 7) that is located within the circle formed by the upright legs 84 of the frame 83. Extended radially inwardly of the legs 84 are arm members 92 the inner ends of which are connected together by a mounting ring 93 for an electric motor 94 that has a shaft 96 projected downwardly in axial alignment with the discharge outlet 42. The lower end of the shaft 96 carries a pair of radially extended spiral shaped vanes 97 the outer ends of which project over the flat ring member 91 adjacent the upper surface of the ring member.

Grain flowing through the control passage 98, formed between the lower end 89 of the control member 87 and the top surface of the cooling wall 39, and onto the ring member 91 is moved from the ring member by the vane members 97 to the discharge outlet 42. Since the properly conditioned grain will flow more readily through the control passage 98 than grain requiring additional drying, the vanes 97 will maintain a continuous discharge of all grain that is collected on the ring member 91.

It is seen, therefore, that the grain to be dried is continuously subjected to a free flow of drying air from the time it enters the machine 15 at the hopper 78 until it is discharged through the outlet 42. In this respect it will be noted that the annular grain passage 32 is about six inches wide as defined by the legs of the channel members 24 and 26 and extends over the full height of the hot air chamber 67 so as to form the peripheral wall thereof. Likewise, as the grain from the annular passage 32 travels over the cooling wall 39 it is subjected to the action to the blower unit 51. As previously mentioned the cooling wall 39 is of an appreciable area and with a grain flow thereover limited to a thickness of about three inches a free flow of air therethrough is permitted. Additionally, the flow of grain is at a controlled rate through the adjustments of the control valve 68 and control mechanism 82 to provide for a proper drying of the grain regardless of its initial moisture content or prevailing wind conditions during a drying operation.

In the drying of grain the action of the forced air thereon effects a separation of the chaff and fines that are generally intermixed therewith. The collection of this fine material within a drying machine wil create a fire hazard unless it is periodically removed from the drying machine. This removal of the fine material is an inconvenience to the machine operator and as a result is often neglected.

Figure 3:
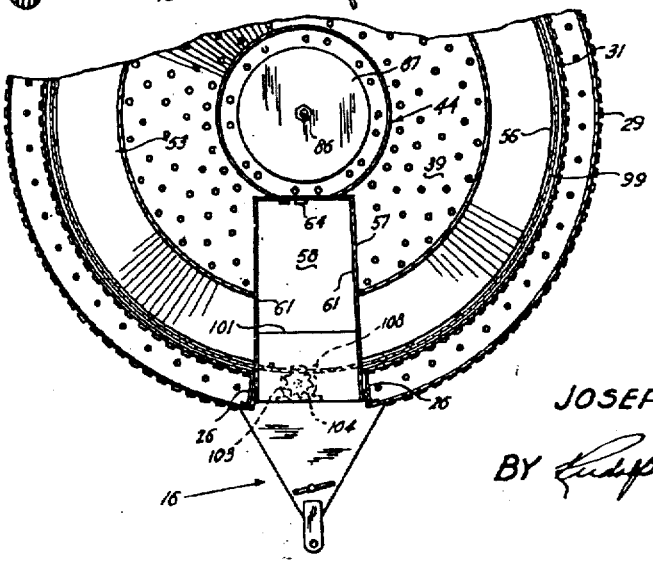
FIG. 3 is a sectional view taken on the line 3—3 in FIG. 1.

In the present invention the fine material is continuously removed from the machine so as to positively eliminate any fire hazard. Thus, as previously described in connection with FIG. 4 the lower peripheral portion of the partition member 53 terminates in a ring member 56 of a channel shape in transverse section. This ring member forms a track for an endless chain 99 which, at the cutaway portion 57 of the partition member 53, extends through the operator compartment 58 (FIG. 3). Mounted within the compartment 58 is a collection box 101 (FIG. 8) for the fine material that has a hinged bottom door 102. A motor 103 supported within the box 101 has a drive gear 104 in meshed engagement with the chain 99.

Figure 8:
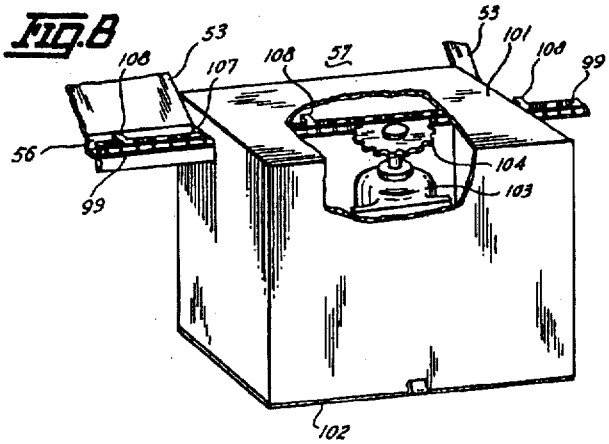
FIG. 8 is a perspective of a dust collector that forms a part of the machine, with portions broken away to more clearly show its construction.

As best appears in FIGS. 3 and 8 the chain 99 travels through openings 106 formed in a pair of opposite side walls of the box 101. The adjacent ends of the track 56, at the cutaway portion 57 of the partition member 53 are continued so as to extend inwardly of the box 101 at the openings 106. The chain 99 over the length thereof is provided with a series of laterally projected spaced sweeping fingers 108.

A portion of the fine material will enter the hot air chamber 67 (FIG. 4) through the perforated inner wall 31 and perforated top wall 38. Likewise, another portion of the fine material will be blown upwardly from the grain traveling on the cooling wall 39 and through the heater unit 44 into the hot air chamber 67. This fine material within the chamber 67, although acted upon by air discharged from the heater outlet 48, will gravitate downwardly of the chamber 67 and along the top surface of the partition member 53 for collection in the track member 56. The fine material thus collected is moved along the track by the sweeping action of the chain 99 and the fingers 108. As the chain and fingers leave the track 56 for travel through the box 101 the fine material moved by the chain and the fingers 108 is dropped into the box 101 from which it is removed on opening of the bottom door 102. It is seen, therefore, that any fine material entering the hot air chamber 67 is continuously removed from the zone of the heater unit 44 for deposit within the box 101.

I claim:

1. A grain drying machine comprising:

(a) a cylindrical shaped perforated outer wall, (b) an inverted cone shaped perforated bottom wall for said outer wall, having a centrally disposed circular grain outlet, (c) a cylindrical shaped perforated inner wall mounted in a concentrically spaced relation within said outer wall, with the lower end thereof spaced above said bottom wall, (d) a cone shaped perforated top wall for said inner wall, (e) the space between said inner and outer walls defining a grain passage, the space between the lower end of the inner wall and said bottom wall defining an outlet for said grain passage, and the space within said inner wall defining an air chamber means, with grain supplied into the top end of the outer wall being flowable through said grain passage and the outlet therefor onto said bottom wall for downward travel to said grain outlet, (f) a heating unit centrally disposed within said air chamber means, including a burner and a blower, (g) partition member for dividing said air chamber means into an upper heated air section and a lower cool air section, (h) said blower acting to draw cool air through the bottom wall of said outer wall and into said cool air chamber section for discharge through the heating unit and into said heated air section for flow of the heated air transversely of the grain passage through said inner and outer walls, and (i) means for controlling the flow of grain from said grain passage outlet onto said bottom wall.

2. The grain drying machine according to claim 1 wherein:

(a) said heating unit includes an upright cylindrical housing having a heated air outlet at the top thereof, and a cool air inlet at the bottom thereof, and (b) said blower mounted within the lower end of said housing so as to continuously draw cool air through said bottom wall and the grain thereon.

3. The grain drying machine according to claim 1 wherein:

(a) said control means includes an upright control member of a ring shape telescopically received within the lower end of said inner wall for extension and retraction therefrom, and (b) means adjustably supporting said control members for adjustable extension and retraction from the lower end of said inner wall to control the flow of grain from said grain passage outlet to said grain outlet.

4. The grain drying machine according to claim 1 including:

(a) means for controlling the flow of grain through said grain outlet having an upright regulating member of a ring shape concentrically spaced about said grain outlet, (b) an upright frame of an open construction mounted on said bottom wall about said grain outlet and within the confines of said adjustable member, and (c) means adjustably supporting said regulating member on said frame means for movement axially of said grain outlet toward and away from said bottom wall.

5. The grain drying machine according to claim 4 including:

(a) a motor on said frame means having a downwardly projected shaft coaxial with said grain outlet, and (b) a sweep member mounted on said shaft above said grain outlet having end portions movable over the bottom wall portion adjacent the grain outlet for discharging into said grain outlet the grain moving thereto from said regulating member.

6. The grain drying machine according to claim 1 wherein:

(a) said partition member is of a frustum shape having a top end secured about said heating unit and a bottom end secured to said inner wall adjacent the lower end thereof, (b) a dust removing means including dust collecting ring extended about the periphery of the bottom end of said partition member and having a section thereof removed to form a dust discharge portion, (c) a dust container enclosing said discharge portion, (d) an endless dust conveying means ridable on said collecting ring and movable through said dust container to unload the dust conveyed thereby at said discharge portion, and (e) motor means in said dust container for operating said conveyor means.

7. The grain drier according to claim 6 wherein:

(a) said dust collecting ring is of a channel shape in transverse section, and (b) said conveyor means includes a chain having a series of laterally projected sweep members ridable in said collecting ring.

8. The method of drying grain which comprises:

(a) supplying the grain to be dried into an upright annular grain passage having perforated side walls, (b) directing the grain from the lower end of said passage for downward flow on a downwardly converging perforated cooling wall having a centrally disposed dried grain outlet, (c) drawing cool air upwardly through said cooling wall and the grain thereon, (d) heating said cool air and directing the heated air transversely through said grain passage from the inner wall to the outer wall thereof, and (e) controlling the flow of grain at the lower end of said passage so that only dried grain flows therefrom onto said cooling wall for discharge through said dried grain outlet.

*9. A grain drying machine according to claim 1 wherein:*

*(a) said heated air on transverse flow through the grain passage is exhausted directly into the atmosphere, and*

*(b) the means for controlling the flow of grain from said grain passage outlet onto said bottom wall includes a downward extension of said inner wall to form with the top surface of said bottom wall a grain passage outlet with a vertical height less than the width of said annular passage, and an annular grain flow-retarding member spaced upwardly from said bottom wall and coacting with the upper surface thereof to form a layer of grain on said bottom wall of a predetermined thickness.*

*10. A grain drying machine according to claim 9 wherein:*

*(a) said grain outlet has a side wall defined by a horizontal ring member,*

*(b) a rotatable sweep member supported in a coaxial relation with said grain outlet having sweep portions movable about said ring member adjacent the top surface thereof, and*

*(c) means for operating said sweep member to continuously move, from said ring member and into said grain outlet the dried grain that has flowed into the rotational path of said sweep portions.*

*11. A grain drying machine according to claim 10 wherein:*

*(a) said sweep portions having the terminal ends thereof spaced inwardly from the outer peripheral surface of said ring member.*

*12. The method of drying grain which comprises:*

*(a) supplying the grain to be dried into an upright grain passage having perforated side walls,*

*(b) directing the grain from the lower end of said passage for downward flow onto a downwardly inclined perforated drying and cooling wall the lower end of which terminates in a horizontal shelf defining the side wall of a dried grain outlet,*

*(c) drawing cool air upwardly through said cooling and drying wall and the grain thereon,*

*(d) heating said upwardly drawn cool air and forcing the heated air into the atmosphere transversely through said grain passage from the inner wall to the outer wall thereof and over substantially the full length thereof,*

*(e) controlling the flow of grain downwardly of said grain passage and the drying and cooling wall at a rate providing for the drying of the grain to a predetermined moisture content, and*

*(f) removing from said shelf for discharge into said outlet only grain on the shelf that is spaced outwardly from the lower end of said drying and cooling wall.*

References Cited

The following references, cited by the Examiner, are of record in the patented file of this patent or the original patent.

UNITED STATES PATENTS

| | | | |
|---|---|---|---|
| 210,793 | 12/1878 | Luckenbach | 34—15 |
| 2,576,058 | 11/1951 | Weber | 34—20 |
| 2,627,670 | 2/1953 | Hurst | 34—174 |
| 2,799,947 | 7/1957 | Slevess | 34—15 |
| 2,991,559 | 7/1961 | Pierpoint | 34—174 |
| 3,233,337 | 2/1966 | Tomlinson | 34—65 |
| 3,237,315 | 3/1966 | Benecke | 34—65 |
| 3,313,040 | 4/1967 | Mathews | 34—174 |
| 3,333,348 | 8/1967 | Ausherman | 34—174 |
| 1,086,950 | 2/1914 | Stanton | 34—15 |
| 3,175,302 | 3/1965 | Retali | 34—20 |

WILLIAM J. WYE, Primary Examiner

U.S. Cl. X.R.

34—22, 65, 130, 169, 174